United States Patent
Dhoolia et al.

(10) Patent No.: US 9,372,777 B2
(45) Date of Patent: Jun. 21, 2016

(54) COLLECTING AND ATTACHING A BUG TRACE TO A PROBLEM INFORMATION TECHNOLOGY TICKET

(71) Applicant: International Business Machines Corporation, Armonk, NY (US)

(72) Inventors: Pankaj Dhoolia, Ghaziabad (IN); Diptikalyan Saha, Bangalore (IN); Ram Viswanathan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 13/780,759

(22) Filed: Feb. 28, 2013

(65) Prior Publication Data

US 2014/0245075 A1    Aug. 28, 2014

(51) Int. Cl.
*G06F 11/34* (2006.01)
*G06F 11/32* (2006.01)

(52) U.S. Cl.
CPC ........ *G06F 11/3466* (2013.01); *G06F 11/3438* (2013.01); *G06F 11/323* (2013.01); *G06F 2201/865* (2013.01)

(58) Field of Classification Search
CPC ............ G06F 11/3438; G06F 11/3636; G06F 11/3466; G06F 17/30002; G06F 17/30893
USPC ......................................................... 714/45
See application file for complete search history.

(56) References Cited

U.S. PATENT DOCUMENTS

| | | | |
|---|---|---|---|
| 6,742,141 B1 | 5/2004 | Miller | |
| 7,266,734 B2 | 9/2007 | Chavez, Jr. et al. | |
| 7,471,194 B2 | 12/2008 | Itou | |
| 7,568,133 B1 | 7/2009 | Bette et al. | |
| 7,600,221 B1* | 10/2009 | Rangachari | G06F 9/3808 712/215 |
| 7,793,160 B1* | 9/2010 | McClure | G06F 11/3636 714/37 |
| 7,810,071 B2 | 10/2010 | Thebes et al. | |
| 8,181,069 B2* | 5/2012 | Gupta et al. | 714/45 |
| 8,971,517 B2* | 3/2015 | Keren et al. | 379/265.06 |
| 2003/0159133 A1* | 8/2003 | Ferri | G06F 11/3636 717/130 |
| 2004/0019827 A1* | 1/2004 | Rohfleisch et al. | 714/29 |
| 2006/0242627 A1* | 10/2006 | Wygodny et al. | 717/128 |
| 2008/0162688 A1* | 7/2008 | Reumann et al. | 709/224 |
| 2008/0168531 A1* | 7/2008 | Gavin | H04L 63/1408 726/1 |
| 2008/0256399 A1 | 10/2008 | Erdosi et al. | |
| 2009/0106826 A1* | 4/2009 | Palestrant | 726/7 |
| 2009/0168664 A1* | 7/2009 | Washburn | H04L 41/12 370/254 |
| 2009/0276728 A1* | 11/2009 | Doan | G06Q 10/10 715/810 |
| 2010/0010848 A1* | 1/2010 | Marchman | G06Q 10/06 705/7.12 |
| 2010/0031095 A1 | 2/2010 | Ruan et al. | |

(Continued)

OTHER PUBLICATIONS

Wei, Xing et al., "Automatic Structuring of IT Problem Ticket Data for Enhanced Problem Resolution," 10th IFIP/IEEE Integrated Network Management, IM'07, Munich Germany, May 21-25, 2007, Abstract Only, 1 page, IEEE Xplore Digital Library.

*Primary Examiner* — Loan L. T. Truong
(74) *Attorney, Agent, or Firm* — Ference & Associates LLC

(57) ABSTRACT

Methods and arrangements for enhancing a ticket relative to user interaction with a system. An information technology ticket related to user interaction with an information technology system is received, and a system trace is activated, wherein additional input related to the user interaction with the information technology system is accepted. Information derived from the trace of the information technology system is associated with the information technology ticket. Other variants and embodiments are broadly contemplated herein.

14 Claims, 4 Drawing Sheets

(56) References Cited

U.S. PATENT DOCUMENTS

| | | | |
|---|---|---|---|
| 2010/0138811 A1* | 6/2010 | Jayaraman | G06F 11/3466 717/125 |
| 2011/0047477 A1 | 2/2011 | White et al. | |
| 2011/0258609 A1 | 10/2011 | Maczuba | |
| 2011/0314343 A1* | 12/2011 | Hoke et al. | 714/45 |
| 2012/0066547 A1* | 3/2012 | Gilbert et al. | 714/26 |
| 2012/0151272 A1* | 6/2012 | Behrendt et al. | 714/39 |
| 2013/0124807 A1* | 5/2013 | Nielsen | G06F 11/1438 711/162 |
| 2013/0139128 A1* | 5/2013 | Jones | G06F 11/3664 717/128 |
| 2013/0179855 A1* | 7/2013 | Elliott | 716/139 |
| 2013/0291127 A1* | 10/2013 | Bergman | G06F 17/30 726/30 |
| 2013/0294257 A1* | 11/2013 | Gonzalez de Langarica et al. | 370/242 |
| 2013/0300744 A1* | 11/2013 | Fulton | G06T 11/206 345/440 |
| 2014/0006874 A1* | 1/2014 | Bohling et al. | 714/45 |

* cited by examiner

COLLECTING AND ATTACHING A BUG TRACE TO A PROBLEM INFORMATION TECHNOLOGY TICKET

BACKGROUND

Generally, when a user interacts with an IT (information technology) system, problems may be encountered that warrant referral to an IT professional. Thus, a "ticket" is logged to report the incident.

Upon receipt of the ticket, an IT professional can handle the matter expeditiously under favorable conditions. However, impediments often arise that make such resolution difficult if not impossible. For instance, an inferior quality of information relative to the incident on the ticket can only serve to communicate the problem inadequately to the IT professional. An unproductive knowledge management search may follow. It may be difficult to replicate any bug that is present (e.g., by simulating user actions that apparently led to a bug, or by replicating environmental settings and/or data setup). If the bug cannot adequately be replicated, an unproductive or fruitless attempt at debugging and fixing the problem may follow, especially inasmuch as automated debugging techniques may not then be usable.

BRIEF SUMMARY

In summary, one aspect of the invention provides a method of managing an information technology ticket, said method comprising: utilizing a processor to execute computer code configured to perform the steps of: receiving an information technology ticket related to user interaction with an information technology system; thereupon activating a trace of the information technology system, wherein additional input related to the user interaction with the information technology system is accepted; and associating information derived from the trace of the information technology system with the information technology ticket.

Another aspect of the invention provides an apparatus for managing an information technology ticket, said apparatus comprising: at least one processor; and a computer readable storage medium having computer readable program code embodied therewith and executable by the at least one processor, the computer readable program code comprising: computer readable program code configured to receive an information technology ticket related to user interaction with an information technology system; computer readable program code configured to activate a trace of the information technology system, wherein additional input related to the user interaction with the information technology system is accepted; and computer readable program code configured to associate information derived from the trace of the information technology system with the information technology ticket.

An additional aspect of the invention provides a computer program product for managing an information technology ticket, said computer program product comprising: a computer readable storage medium having computer readable program code embodied therewith, the computer readable program code comprising: computer readable program code configured to receive an information technology ticket related to user interaction with an information technology system; computer readable program code configured to activate a trace of the information technology system, wherein additional input related to the user interaction with the information technology system is accepted; and computer readable program code configured to associate information derived from the trace of the information technology system with the information technology ticket.

A further aspect of the invention provides a method comprising: receiving a ticket related to a bug encountered in user interaction with a system; thereupon prompting the user to re-execute at least one step from the user interaction related to the bug; creating a visual timeline related to the re-executed at least one step; and attaching the visual timeline to the ticket.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
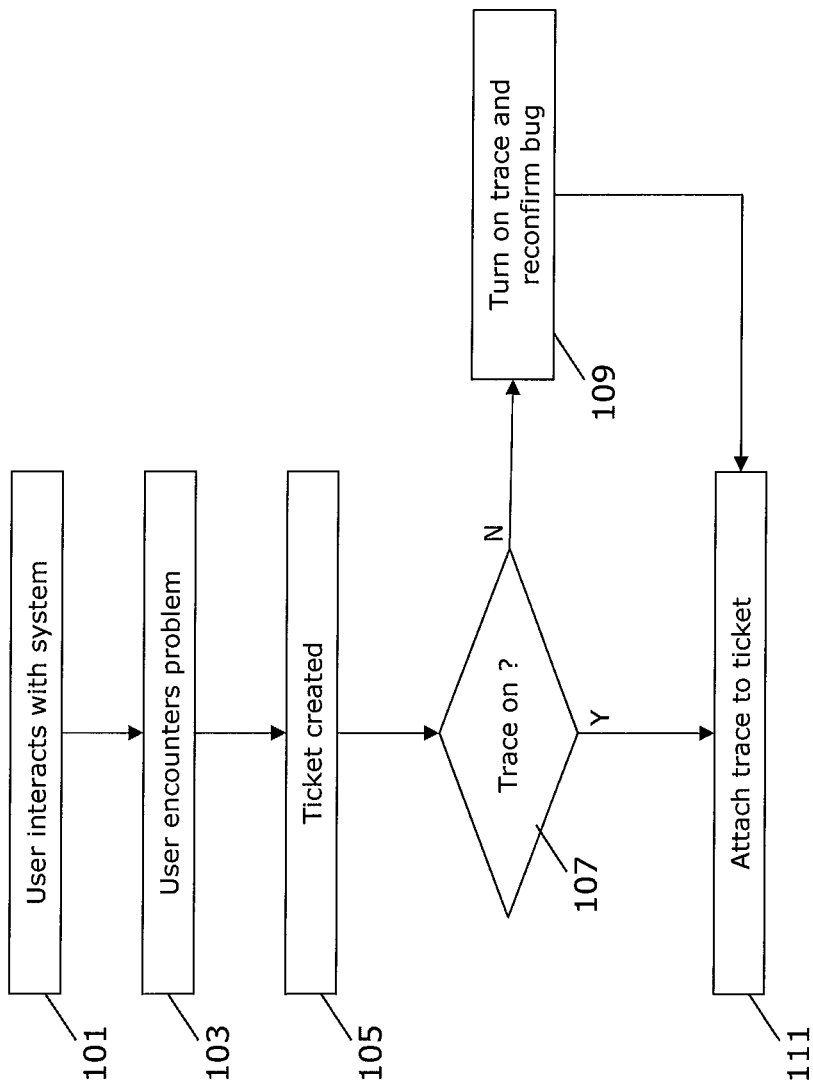
FIG. 1 schematically illustrates a process of turning on and attaching a ticket trace.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

In accordance with at least one embodiment of the invention, there is provided a runtime environment feature of, configuration, or demand-based turning on/off of tracing user interaction and correlated program execution. In one implementation, demand-based switching-on of tracing is implemented by instrumenting program byte-code/binary associated to the program, such that the instrumentation traces the program execution path specifically for the user/session context corresponding to the user/session in which the trace is turned on. Switching-off reverts the byte-code/binary to the state prior to instrumentation.

In accordance with at least one embodiment of the invention, there is provided a runtime environment feature of, visualizing the traced interwoven chronology of user interaction, and correlated program execution events as a timeline with specialized visualization for different kind of events and transaction boundaries. The transaction boundaries may be determined in a runtime environment specific manner. In one implementation (e.g., for a J2EE [Java 2 Platform, Enterprise Edition] runtime environment), information from the deployment configuration files may be correlated with the execution trace to place transaction start/join points at appropriate method start and end events. In another implementation, (e.g., for a SAP environment [for software products of SAP AG, Walldorf, Germany]), the starting of trace events from programs that are correlated with transaction IDs may be used to place transaction starts.

In accordance with at least one embodiment of the invention, there is provided a feature that allows a selection of the timeline to be exported/attached to a ticket. Selection of the ticket relevant trace may be made on the visualization of the timeline, and then exported to get a structured textual representation.

As shown in FIG. 1, in accordance with at least one embodiment of the invention, a user first interacts with a system (101) and then encounters a problem (103). A ticket for solving the problem is created (105), and if (107) a trace is not already on, one is turned on and the bug is reconfirmed (109). At that point, or if a trace were already on, the trace is attached to the ticket (111). Reconfirming (109) can involve, before creating a ticket, a user confirming for certain that a problem exists (e.g., that did not arise because of a mistake on the user's part). Further, this step can assist in that, if a trace is not already turned on, then the system may not be able to provide a visualization of the user's actions (itself to be covered in greater detail herebelow), thereby preventing the ability of the system to process selection and augmentation of the ticket. Hence, after turning on the trace on-demand, when the user re-confirms the problem, e.g., by performing the same actions on the system, the system will now have the visualization of the events' timeline to select, and add to the ticket.

Accordingly, in accordance with at least one embodiment of the invention, a platform level feature is provided to trace user interaction as well as execution events, and this feature may be turned on or off on-demand. Further, a platform level feature is provided that visualizes an interwoven chronology of user interaction and correlated execution trace events as a timeline. Additionally, a platform level feature is provided that permits selecting a portion of the timeline and attaching related trace information (in the form of structured information) to a ticket. The attached trace information in the ticket is then used to reproduce and analyze the bug, and to subsequently verify a successful fix.

Figure 2:
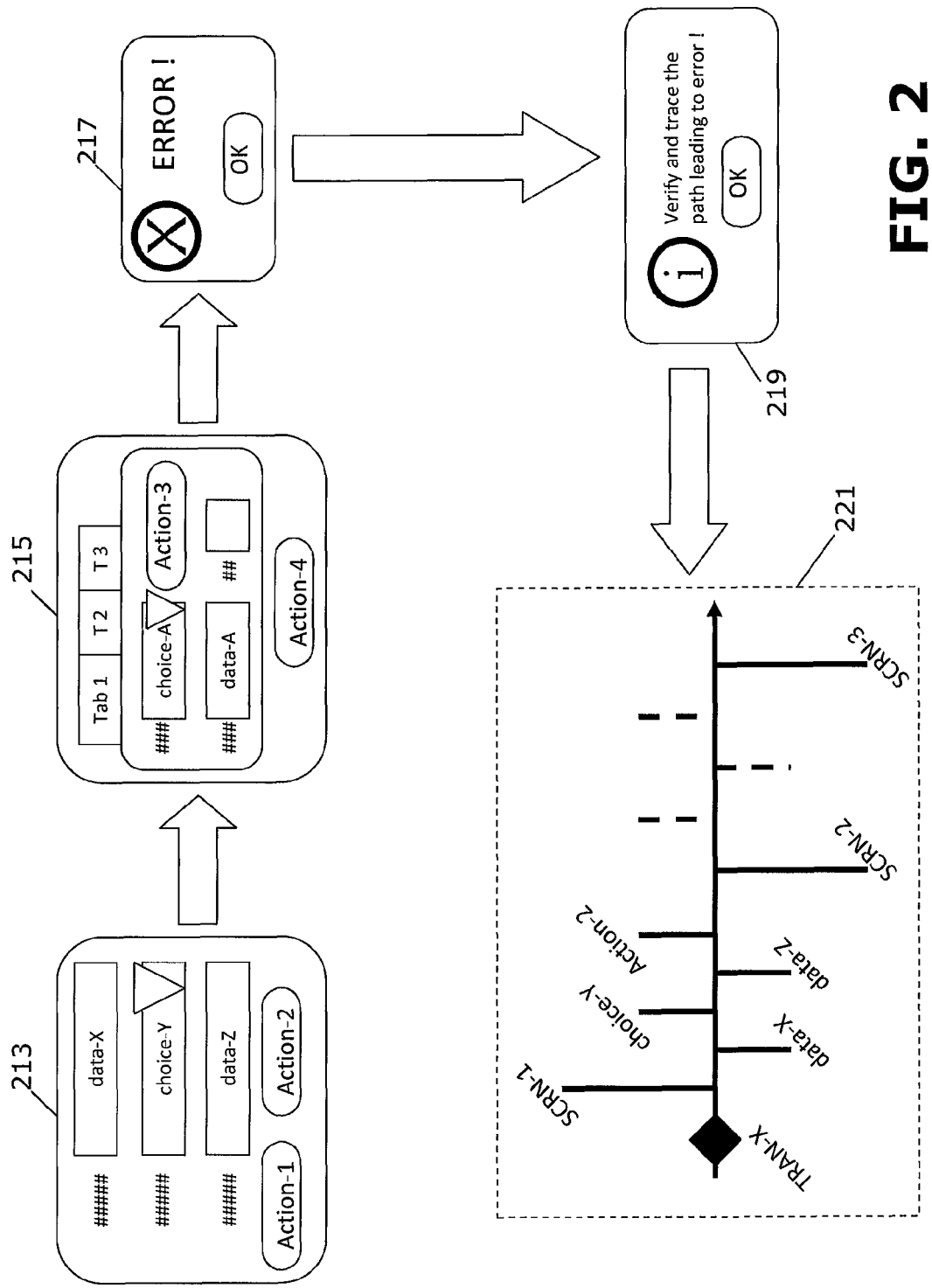
FIG. 2 schematically illustrates a session of user interaction with a system.

As shown in FIG. 2, in accordance with at least one embodiment of the invention, a user first may interact with a first screen 213 ("Screen 1") to provide input in the course of normal user-system interaction. The system then displays a second screen 215 ("Screen 2") to permit the user to provide input, again in the course of characteristic user-system interaction. A third screen 217 ("Screen 3") then indicates an exceptional incident, for which the user may want to verify or raise a ticket.

In accordance with at least one embodiment of the invention, integrated ticket logging (219) may remind the user to trace the path leading to the error, if trace mode were not already turned on. As such, depending on the scenario, the trace toggle may operate at a framework, application or user session level, or a combination thereof. Similarly, different embodiments may permit the trace to be logged on the server or client.

In accordance with at least one embodiment of the invention, a traced event timeline 221 may be displayed, whereupon the user may be asked to associate the relevant part of the process to the ticket. Thus, here a relevant timeline segment may be selected and associated to the ticket, with different segments of the timeline being clickable. As shown in the illustrative timeline 219, a first action "TRAN-X" may be followed by the appearance of the three screens 213/215/217 ("SCRN-1", "SCRN-2" and "SCRN-3" respectively). (Here, "TRAN" refers to a general logical notion of a transaction, which could involve, e.g., a SAP transaction or J2EE transaction as noted heretofore.) As also shown in the illustrative timeline 219, between "SCRN-1" and "SCRN-2" appear segments of "data-X", "choice-Y", "data-Z" and "Action-2".

Generally, in accordance with at least one embodiment of the invention, the segments in timeline 219 are provided here merely by way of illustrative and non-restrictive example, and each can potentially relate to a very wide variety of user-selected actions, and displays of data and other items, etc., that may occur during a user's interaction with a system. As such, "data" here refers to any data that the user may have provided as input to the system during a course of interaction. "Choice" here refers to user interactions that require or compel the user to make a selection. (For instance, it can be appreciated that several user interface components such as drop-down menus, boxes, radio buttons, etc., permit a user to select from different choices offered by the system.) "Action" here refers to clicking on an actionable user interface component (e.g., a button) as part of the user's interaction with the system.

In accordance with at least one embodiment of the invention, where the runtime environment provider is also the provider of the ticket management, a user's association of the traced events relevant to the ticket may be kept in the database as a link between the ticket and the trace. In a scenario where the ticket management tool provider is different from the runtime environment provider, the user may explicitly export the trace to a structured file, and then explicitly attach that trace export file to the ticket created in the external ticket management tool.

With regard to timeline 219, in accordance with at least one embodiment of the invention, different variants are contemplated. In one variant, the timeline 219 may be displayed subsequent to the process of tracing steps, and during ticket creation. In another variant, the timeline 219 could be live-updated (i.e., updated dynamically) in step with user interaction (with the system) and system processing as they occur. Accordingly, in the first variant, the entire timeline 219 would be created only after a trace is undertaken (or after some other predetermined or user-selected point) while in the second variant segments of timeline 219 (e.g., "TRAN-X", "SCRN-1", "data-X", "choice-Y", "data-Z", etc.) may appear, by way of gradually building up the full timeline 219, solely as they temporally occur.

Figure 3:
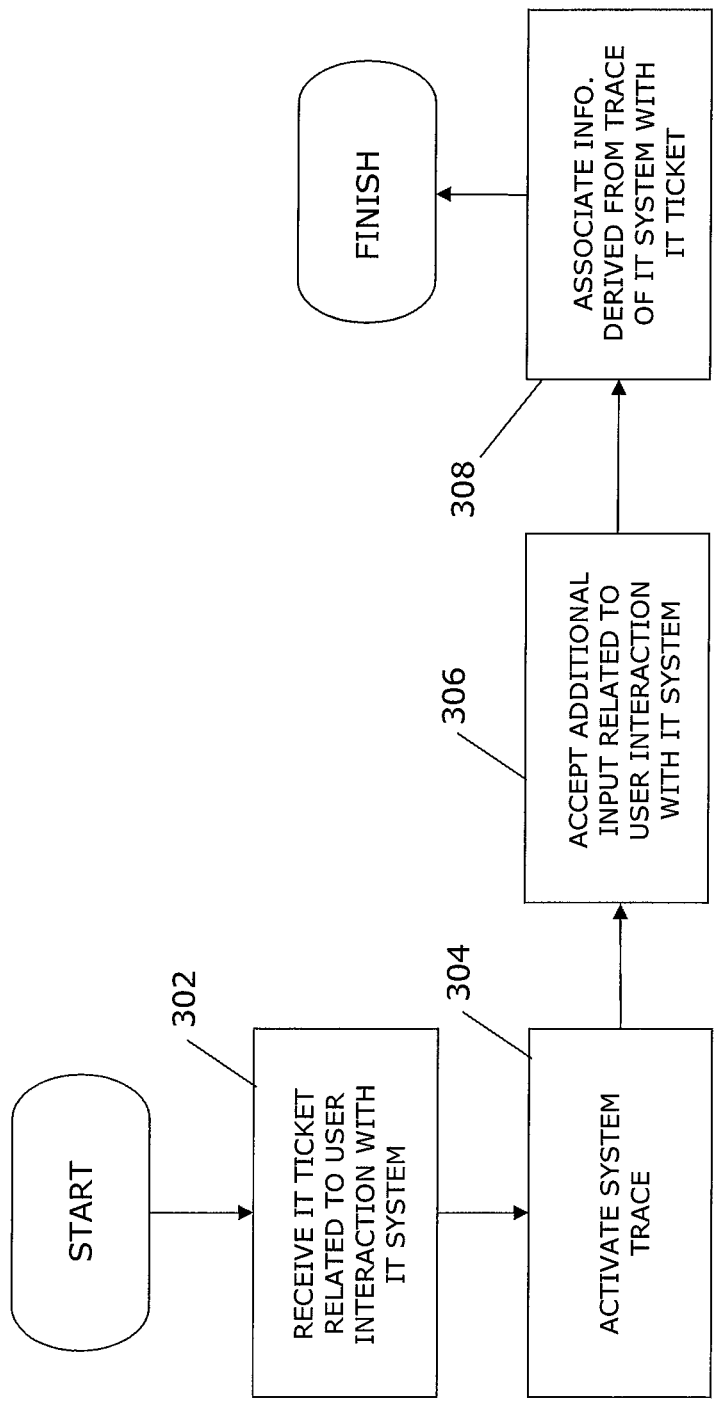
FIG. 3 sets forth a process more generally for managing an information technology ticket.

FIG. 3 sets forth a process more generally for managing an information technology ticket, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, an information technology ticket related to user interaction with an information technology system is received (302), and a system trace is activated (304), wherein additional input related to the user interaction with the information technology system is accepted (306). Information derived from the trace of the information technology system is associated with the information technology ticket (308).

Figure 4:
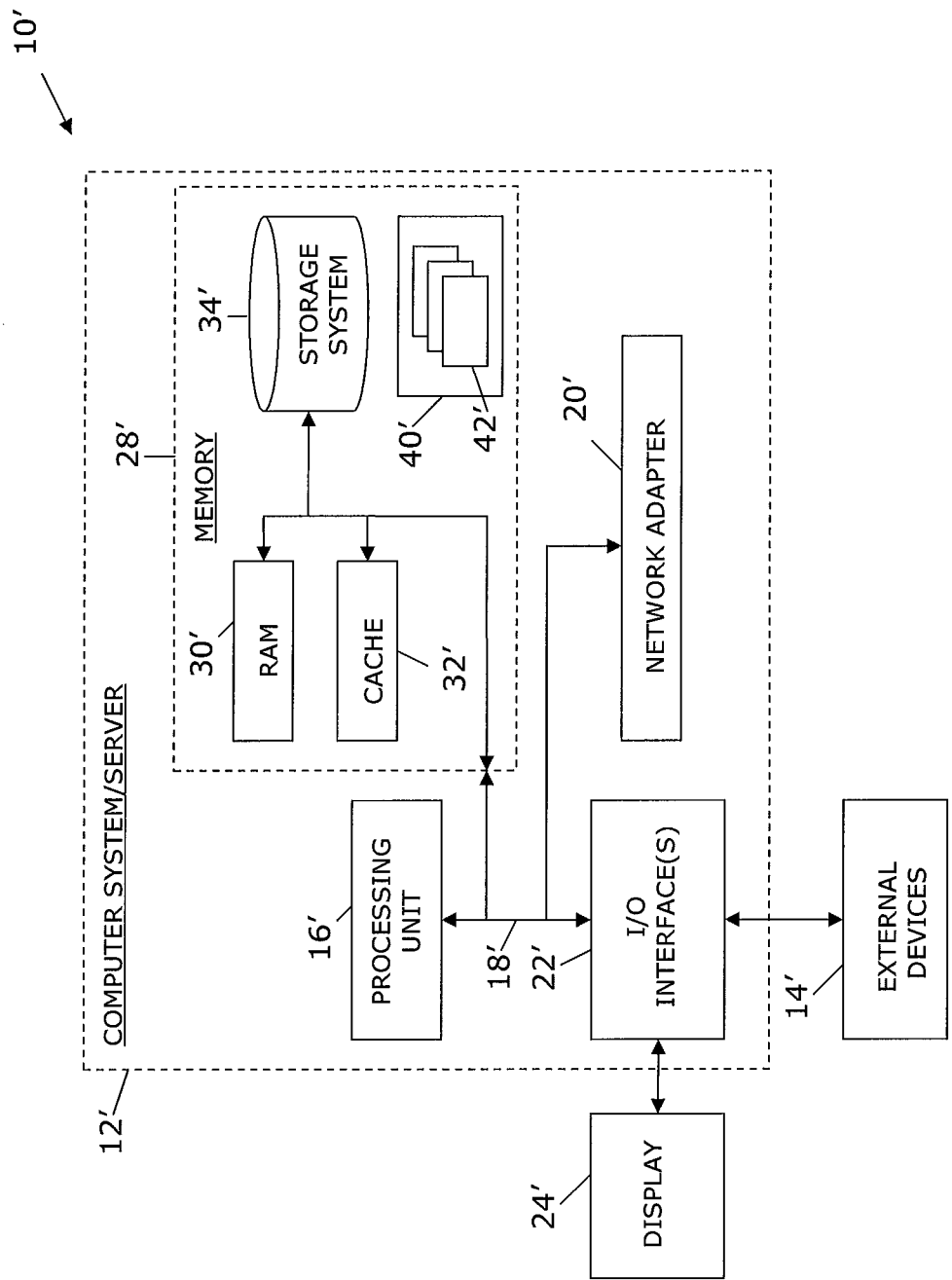
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of managing an information technology ticket, said method comprising:
   utilizing a processor to execute computer code configured to perform the steps of:
   receiving an information technology ticket related to user interaction, when a user encounters a problem with an information technology system;
   activating and dynamically updating a trace of the information technology system, wherein the trace comprises data related to program execution on the information technology system before receipt of the information technology ticket;
   accepting additional user input reconfirming the problem;
   providing a visual timeline which represents information related to a segment of the user interaction; and
   associating information derived from the trace of the information technology system with the information technology ticket;
   wherein said associating comprises attaching, to the ticket information relating to the segment from the visual timeline; and
   wherein the additional input related to the user interaction with the information technology system comprises the segment from the visual timeline selected for action by the user.

2. The method according to claim 1, wherein said activating and updating comprises turning on the system trace in response to user input.

3. The method according to claim 1, wherein said activating comprises turning on the system trace automatically.

4. The method according to claim 1, wherein said updating comprises prompting the user to re-execute at least one step of the user interaction.

5. The method according to claim 4, wherein the additional user input related to the user interaction with the information technology system comprises information related to re-execution of the at least one step.

6. An apparatus for managing an information technology ticket, said apparatus comprising:
   at least one processor; and
   a computer readable storage medium having computer readable program code embodied therewith and executable by the at least one processor, the computer readable program code comprising:
   computer readable program code configured to receive an information technology ticket related to user interaction, when a user encounters a problem with an information technology system;
   computer readable program code configured to activate and dynamically update a trace of the information technology system, wherein the trace comprises data related to program execution on the information technology system before receipt of the information technology ticket;
   computer readable program code configured to accept additional user input reconfirming the problem;
   computer readable program code configured to provide a visual timeline which represents information related to a segment of the user interaction; and
   computer readable program code configured to associate information derived from the trace of the information technology system with the information technology ticket;
   wherein the associating comprises attaching to the ticket information relating to the segment from the visual timeline; and
   wherein the additional input related to the user interaction with the information technology system comprises a segment from the visual timeline selected for action by the user.

7. A computer program product for managing an information technology ticket, said computer program product comprising:
   a non-transitory computer readable storage medium having computer readable program code embodied therewith, the computer readable program code comprising:
   computer readable program code configured to receive an information technology ticket related to user interaction, when a user encounters a problem with an information technology system;
   computer readable program code configured to activate and dynamically update a trace of the information technology system, wherein the trace comprises data related to program execution on the information technology system before receipt of the information technology ticket;
   computer readable program code configured to accept additional user input reconfirming the problem;
   computer readable program code configured to provide a visual timeline which represents information related to a segment of the user interaction; and
   computer readable program code configured to associate information derived from the trace of the information technology system with the information technology ticket;
   wherein the associating comprises attaching to the ticket information relating to the segment from the visual timeline; and
   wherein the additional input related to the user interaction with the information technology system comprises a segment from the visual timeline selected for action by the user.

8. The computer program product according to claim 7, wherein said computer readable program code is configured to activate and update the system trace in response to user input.

9. The computer program product according to claim 7, wherein said computer readable program code is configured to activate the system trace automatically.

10. The computer program product according to claim 7, wherein said computer readable program code is configured to prompt the user to re-execute at least one step of the user interaction.

11. The computer program product according to claim 10, wherein the additional user input related to the user interaction with the information technology system comprises information related to re-execution of the at least one step.

12. A method comprising:
    receiving a ticket related to a bug encountered in user interaction with a system;
    activating and dynamically updating a trace of the system, wherein the trace comprises data related to program execution on the information technology system before receipt of the information technology ticket;
    prompting the user to re-execute at least one step from the user interaction related to the bug;
    creating a visual timeline related to the re-executed at least one step;
    said creating comprising providing on a display a segment from the visual timeline;
    said providing on a display comprises providing the segment of the visual timeline on a clickable interface; and
    attaching the visual timeline to the ticket.

13. A method according to claim 1, wherein said providing of a visual timeline comprises providing on a display the at least one segment from the visual timeline.

14. A method according to claim 13, wherein said providing on a display comprises providing the at least one segment of the visual timeline on a clickable interface.

* * * * *